United States Patent
Haffner

[11] 3,897,959
[45] Aug. 5, 1975

[54] SNOWMOBILE DOLLY

[76] Inventor: Raymond L. Haffner, 407 Avenue "S" West, Fort Dodge, Iowa 50501

[22] Filed: May 23, 1974

[21] Appl. No.: 472,626

[52] U.S. Cl. .................. 280/79.1; 214/506
[51] Int. Cl.² ................................. B62B 3/00
[58] Field of Search .......... 280/79.1; 214/506

[56] References Cited
UNITED STATES PATENTS

| | | | |
|---|---|---|---|
| 2,784,857 | 3/1957 | Duffy | 214/506 |
| 2,937,850 | 5/1960 | Winkler et al. | 280/79.1 X |
| 3,179,271 | 4/1965 | Donahue | 214/506 |
| 3,658,200 | 4/1972 | Chaplinski | 214/506 X |
| 3,693,818 | 9/1972 | Teagarden | 214/506 |

Primary Examiner—David Schonberg
Assistant Examiner—Michael J. Forman
Attorney, Agent, or Firm—Zarley, McKee, Thomte & Voorhees

[57] ABSTRACT

A snowmobile dolly comprising a first frame means having rearward and forward ends with means thereon for supporting the track of the snowmobile thereon. A ramp is provided at the rearward end of the first frame means and has a caster wheel assembly mounted thereon to support the rearward end of the first frame means above the supporting surface. A second frame means is pivotally secured about a horizontal axis to the forward end of the first frame means and includes a pair of spaced apart wheeled ski supports adapted to support the skis of the snowmobile. The first and second frame means are pivotal with respect to each other to permit the rearward ends of the ski supports to move downwardly towards the supporting surface so that the skis of the snowmobile may move upwardly thereon as the snowmobile is moved onto the dolly. The first and second frame means automatically pivot to an aligned horizontal position after the snowmobile skis are properly positioned thereon. A spring means normally yieldably maintains the first and second frames in their horizontal aligned condition. An optional locking means is provided between the first and second frames for locking the frames in their horizontal aligned condition.

7 Claims, 8 Drawing Figures

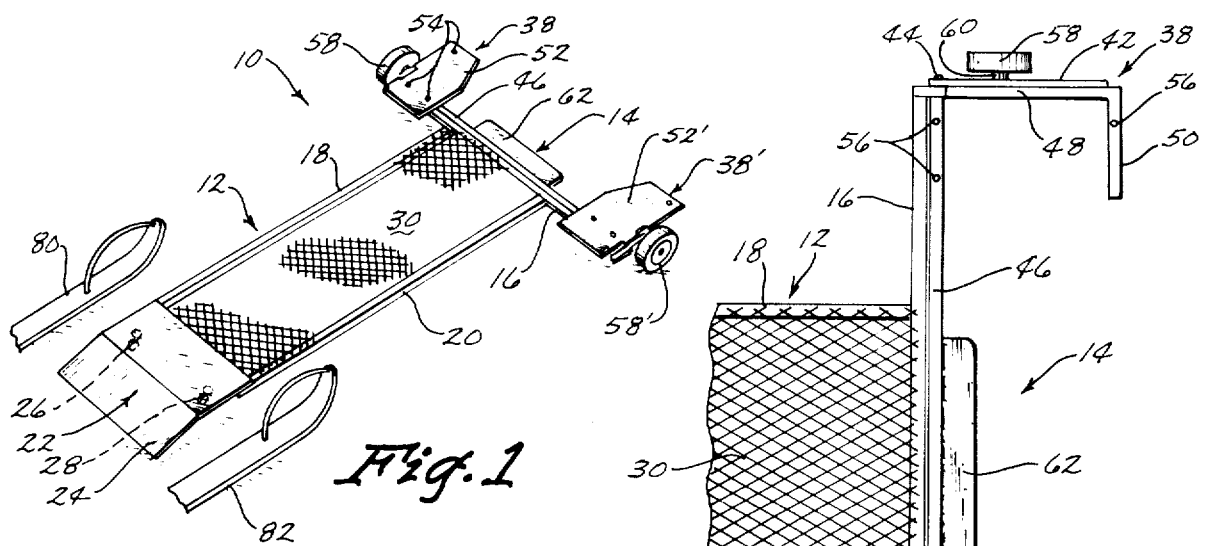
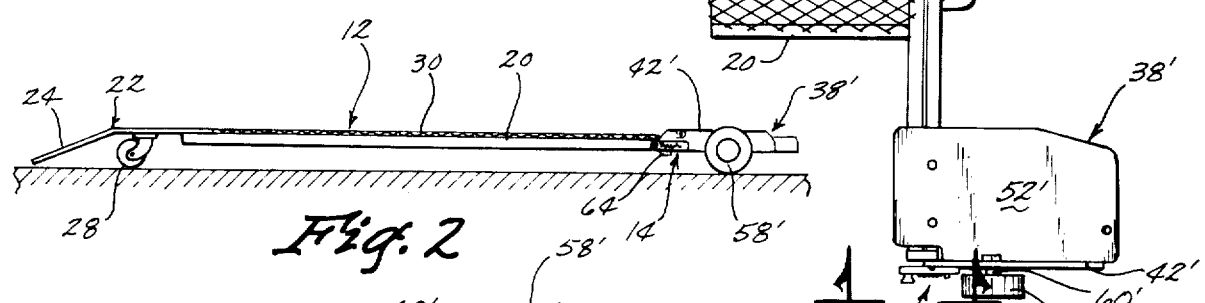
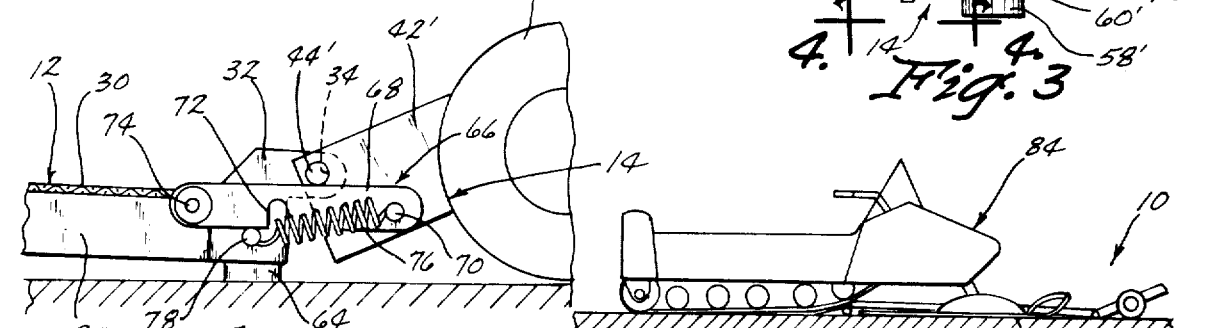
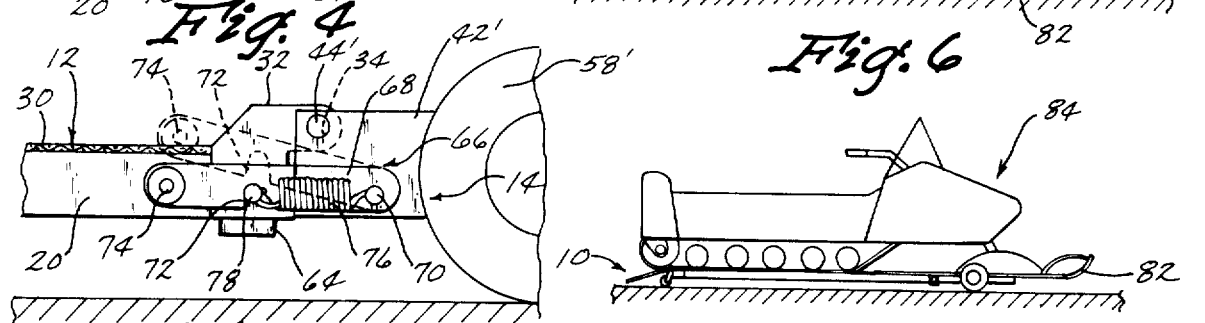
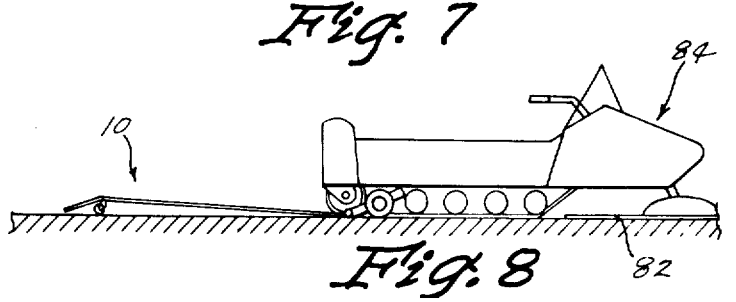

SNOWMOBILE DOLLY

BACKGROUND OF THE INVENTION

This invention relates to a dolly and more particularly to a dolly which may be used for snowmobiles. Snowmobiles are quite heavy and are difficult to manually move due to the engagement of the skis and the track with the supporting surface.

Therefore, it is a principal object of the invention to provide a snowmobile dolly.

A further object of the invention is to provide a snowmobile dolly which permits the snowmobile to be easily moved from one location to another without operating the snowmobile.

A further object of the invention is to provide a snowmobile dolly having means thereon to facilitate the loading of the snowmobile thereon.

A further object of the invention is to provide a snowmobile dolly having means thereon for locking the dolly in a horizontal position.

A further object of the invention is to provide a snowmobile dolly having means thereon to prevent damage to the dolly and to the snowmobile.

A further object of the invention is to provide a snowmobile dolly which is economical of manufacture, durable in use and refined in appearance.

These and other objects will be apparent to those skilled in the art.

BRIEF DESCRIPTION OF THE DRAWINGS:

This invention consists in the construction and combination of the various parts of the device, whereby the objects contemplated are attained as hereinafter more fully set forth, specifically pointed out in the claims, and illustrated in the accompanying drawings, in which:

FIG. 1 is a perspective view of the dolly:

FIG. 2 is a side elevational view of the dolly:

FIG. 3 is a partial top plan view of the forward end of the dolly with one of the ski support plates removed therefrom to more fully illustrate the invention:

FIG. 4 is a view as seen on lines 4 — 4 of FIG. 3:

FIG. 5 is a view similar to FIG. 4 except that the locking means is locking the first and second frames in their aligned horizontal attitude:

FIG. 6 is a side view illustrating the snowmobile being driven onto the dolly:

FIG. 7 is a side view illustrating the snowmobile mounted on the dolly; and

FIG. 8 is a side view illustrating the snowmobile being driven from the dolly.

DESCRIPTION OF THE PREFERRED EMBODIMENT

The snowmobile dolly of this invention is referred to generally by the reference numeral 10 and generally includes a main frame 12 and a forward frame 14. Frame 12 comprises a transversely extending frame member 16 having a pair of rearwardly extending side frame members 18 and 20 secured thereto. A plate 22 is secured to the rearward ends of side frame members 18 and 20 and includes a downwardly and rearwardly extending ramp portion 24. A pair of pivotal caster wheels 26 and 28 are secured to the underside of plate 22 to facilitate movement of the dolly and to maintain the lower rearward end of ramp portion 24 out of ground engagement.

The numeral 30 refers to an expanded metal material which is secured to side frame members 18 and 20 and which extends thereacross as seen in FIG. 1. Brackets 32 and 32' are welded to the outer ends of frame member 16 as seen in the drawings. As seen in FIG. 4, bracket 32 extends upwardly and forwardly from the forward end of the main frame and has an opening 34 formed in its upper forward end. Bracket 32' likewise has a similar opening to opening 34.

The numeral 14 refers to the forward frame or a ski support which is pivotally mounted on the forward end of main frame 12 and which comprises ski support assemblies 38 and 38'. Inasmuch as ski assemblies 38 and 38' are identical, only ski support assembly 38 will be described in detail with identical structure on ski support assembly 38' being indicated with "'". Ski support assembly 38 comprises a vertically disposed flat plate 42 which is pivotally connected at its upper rearward end to bracket 32 at 44. Transversely extending frame member 46 is welded at one end to the inside lower rearward end of plate 42 and extends parallel to frame member 16. Frame member 48 is welded or otherwise secured to the inside surface of plate 42 as seen in the drawings and includes a laterally extending portion 50. Ski support plate 52 is bolted to frame member 46 and to portion 50 by means of bolts 54 extending downwardly through openings 56. Wheel 58 is rotatably mounted on plate 42 by means of axle shaft 60.

Plate 42' is pivotally connected at its upper rearward end to the upper forward end of bracket 32 at 44'. Ski support assembly 38' is identical to ski support assembly 38 and includes wheel 58', axle shaft 60', ski support plate 52'. The end of frame member 46 is welded to the lower inside surface of plate 42'. As seen in FIG. 3, a frame extension 62 is secured to the central forward portion of frame member 46. A rubber bumper or brake means 64 is secured to frame member 16 and extends downwardly therefrom.

The numeral 66 refers to a locking mechanism provided between main frame 12 and forward frame 14. Latch 68 is pivotally connected at its forward end to plate 42' at 70 forwardly of the lower rearward end thereof. Latch 68 is provided with a notch 72 extending upwardly from the lower edge thereof between the ends of the latch. Notch 72 is defined by a straight rearward wall and an inclined forward wall as best illustrated in FIGS. 4 and 5. Handle 74 is mounted on the rearward end of latch 68 as illustrated in FIG. 4 to provide a means for conveniently operating the latch. Spring 76 is connected at its forward end to pin 70 and is connected at its rearward end to pin 78 which extends outwardly from bracket 32. FIG. 5 illustrates latch 68 in its locked condition and it can be seen that notch 72 receives the pin 78 which prevents the main frame 12 and forward frame 14 from pivoting relatively to each other. The locking mechanism 66 is optional and is provided to maintain the main frame 12 and the ski support 36 in the horizontal aligned condition as illustrated in FIGS. 2 and 5. The springs 76 and 76' yieldably maintain the main frame 12 and the ski support 36 in the horizontal aligned condition illustrated in FIG. 2.

Assuming that the dolly is in the position of FIG. 2, the method of loading and unloading the snowmobile thereon is as follows. Initially, the dolly would be in the position of FIG. 2 to facilitate the movement of the dolly itself from one location to another location during those times that the snowmobile is not mounted thereon.

The snowmobile is then driven onto the dolly from the rearward end thereof so that the skis 80 and 82 of the snowmobile 84 straddle the main frame 12 as illustrated in FIG. 1. As the snowmobile is moved forwardly relative to the dolly, the forward end of the track 86 engages the ramp portion 24 and moves upwardly thereon in the manner illustrated in FIGS. 6 and 7. The weight of the snowmobile on the main frame 12 causes the main frame 12 to pivot to the position of FIGS. 4 and 6 so that bumper 64 engages the supporting surface and so that the ski support plates 52 and 52' are inclined as illustrated. As the snowmobile is moved forwardly relative to the dolly, the skis 80 and 82 move upwardly onto the ski support plates 52 and 52'. When the snowmobile has been moved onto the dolly as illustrated in FIG. 7, the frames 12 and 14 automatically pivotally move relative to each other to their aligned horizontal position. This is accomplished by the weight of the snowmobile being positioned forwardly on the forward frame 14. Thus, when the snowmobile is positioned on the dolly as seen in FIG. 7, the dolly may be easily maneuvered from one location to another location so that the snowmobile may be easily and conveniently transported. It should be noted that it is not necessary for the locking mechanism 66 to be locked when the snowmobile is on the dolly since the weight of the machine maintains the frames 12 and 14 in the horizontal aligned condition so that the bumper 64 is not in engagement with the ground.

When it is desired to remove the snowmobile from the dolly, the snowmobile is simply driven forwardly so that the skis 80 and 82 move from the forward end of the ski supports 52 and 52' respectively. The frame extension 62 facilitates the track 86 in leaving the dolly so that the track or the frame of the snowmobile does not catch on the forward end thereof. The bumper or brake 64 serves to prevent the dolly from being ejected rearwardly by the snowmobile track as the snowmobile is driven from the dolly. The springs 76 and 76' then cause the frames 12 and 14 to pivot to the position of FIG. 2 so that the dolly itself can be easily moved. Thus it can be seen that a unique snowmobile dolly has been provided which accomplishes at least all of its stated objectives.

I claim:

1. A dolly for a snowmobile, comprising,
a first frame means having rearward and forward ends, said first frame means including means for supporting the track of the snowmobile thereon,
a caster wheel means secured to the rearward end of said first frame means for supporting said rearward end above the supporting surface,
a second frame means comprising a pair of spaced apart wheeled ski support means,
said second frame means having rearward and forward ends,
means pivotally securing said second frame means, about a horizontal axis, to the forward end of said first frame means,
said first and second frame means being relatively movable between a first position, and a second position,
said first frame means being substantially horizontally disposed when in its said first position,
said second frame means being substantially horizontally disposed when in its said first position,
the forward end of said first frame means extending downwardly towards the supporting surface when in its said second position,
the rearward end of said second frame means extending downwardly towards the supporting surface when in its said second position,
each of said ski support means including a support plate means normally positioned above the supporting surface and having rearward and forward ends, the rearward ends of said support plate extending downwardly towards the supporting surface when said first and second frame means are in their said second position to facilitate the skis of the snowmobile to move upwardly thereon as the snowmobile is driven forwardly relative to the dolly, said support plates being spaced outwardly of said first frame means
the majority of said ski support means being positioned forwardly of the pivotal connection of said first and second frame means so that the weight of the snowmobile on said ski support means will automatically cause said first and second frame means to move from their said second positions to their said first positions.

2. The dolly of claim 1 wherein a locking means extends between said first frame means and said second frame means for locking said first frame means and said second frame means in their said first position, said first frame means and said second frame means being in a substantially horizontally aligned relationship when in their said first position.

3. The dolly of claim 2 wherein said locking means comprises a latch means.

4. The dolly of claim 1 wherein a spring means is secured to and extends between said first frame means and said second frame means for yieldably maintaining said first frame means and said second frame means in their said first position.

5. The dolly of claim 1 wherein a ramp means extends downwardly from the rearward end of said first frame means.

6. The dolly of claim 1 wherein a brake means extends downwardly from the forward end of said first frame means for engagement with the supporting surface when said first frame means and said second frame means are in their said second position.

7. The dolly of claim 1 wherein an extension means extends forwardly downwardly from said ski support means to aid the snowmobile track in moving therefrom at times.

* * * * *